Patented Apr. 24, 1945

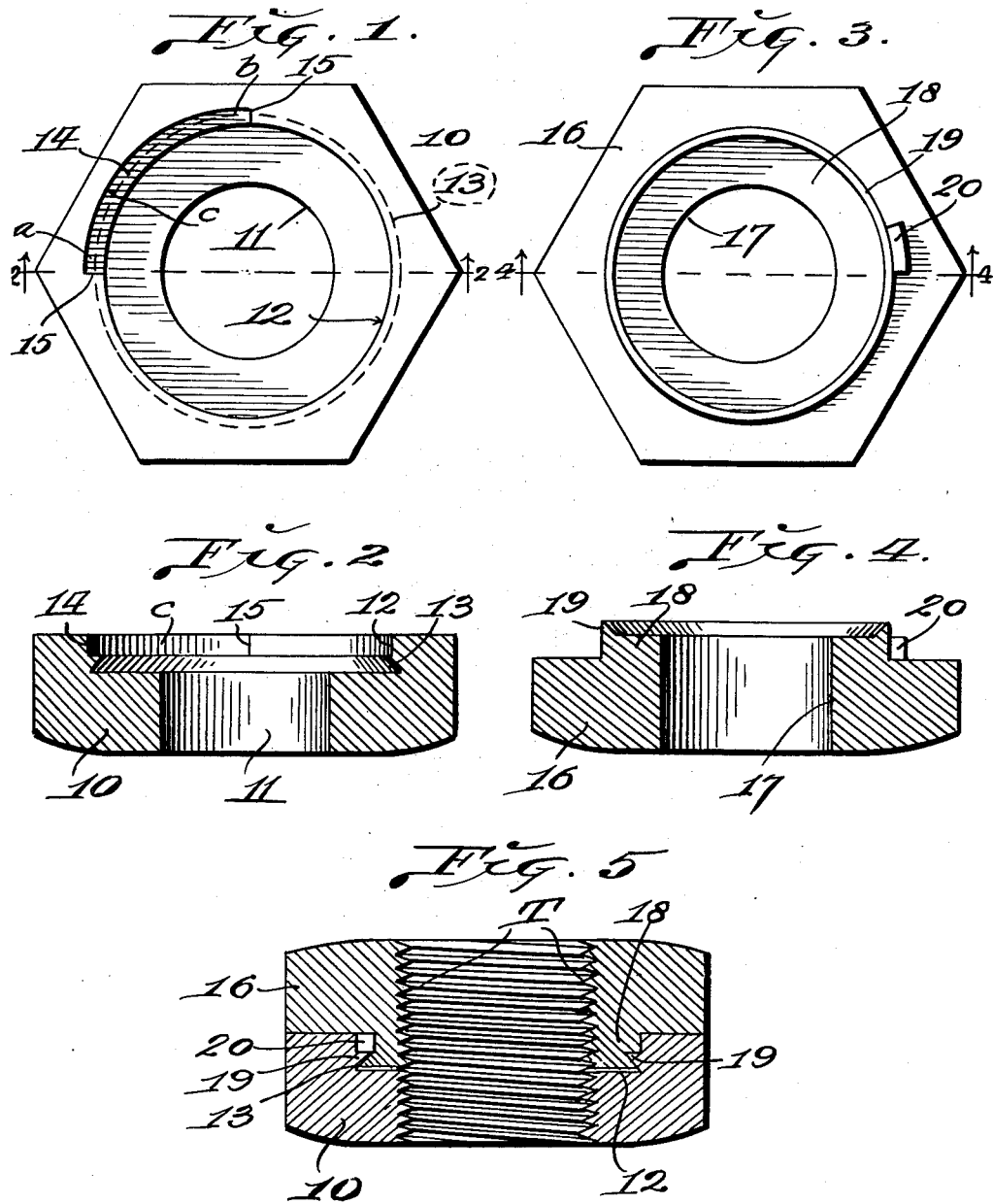

2,374,266

UNITED STATES PATENT OFFICE 2,374,266

LOCK NUT

Oscar Barr, Los Angeles, Calif.

Application July 10, 1944, Serial No. 544,175

2 Claims. (Cl. 151—15)

My invention relates to a lock nut and has for its principal objects, to provide a simple, inexpensive and highly effective nut particularly adapted for use on bolts, tie rods and the like which are subject to vibration tending to loosen and displace the nuts and further, to provide a nut composed of two parts normally inseparably interconnected, with one part mounted for limited rotary movement upon the other part, in order that the latter may be tightly jammed upon the bolt or tie rod.

A further object of my invention is, to provide a nut of the character referred to, which is positive in action, capable of being readily applied to and removed from bolts, inexpensive of manufacture and highly efficient for the purposes for which it is intended.

With the foregoing and other objects in view, my invention consists in certain novel features of construction and arrangement of parts which will be hereinafter more fully described and claimed and illustrated in the accompanying drawing in which:

Fig. 1 is a view looking against the inner face of the female member of the nut.

Fig. 2 is a cross section taken on the line 2—2 of Fig. 1.

Fig. 3 is a view looking against the inner face of the male member.

Fig. 4 is a cross section taken on the line 4—4 of Fig. 3.

Fig. 5 is a cross section taken through the center of the nut with the parts assembled.

Referring by numerals to the accompanying drawing which illustrates a preferred embodiment of my invention, 10 designates the body of the female member of the nut which may be square or hexagonal in shape and provided with a centrally arranged bolt opening 11.

Formed in the inner face of member 10 is a shallow circular recess 12, the lower portion of the circumferential face of which is undercut to form an annular groove or channel 13, preferably V-shape in cross section as illustrated in Fig. 2.

A portion of the body of member 10 above groove 13 is cut away for a distance of ninety degrees, more or less, to form an arcuate groove 14, with abrupt shoulders 15 at each end.

The body 16 of the male member of the nut is similar in size and form, with member 10 and has a centrally arranged bolt hole 17.

Formed on the inner face of member 16 is a centrally arranged circular boss 18 adapted to occupy the recess 12 in member 10 and formed integral with the outer corner of said boss is a lip 19, substantially V-shape in cross section and when member 16 is formed, the outer face of lip 19 is flush with and has the same diameter as the outer face of boss 18.

Formed integral with the outer face of boss 18, below lip 19, is a arcuate lug 20 which may be fifteen degrees, more or less in length and which, when the parts of the nut are assembled, occupies groove 14.

In assembling the parts of the nut, boss 18 is inserted in recess 12 and sufficient pressure is now applied to part 16 to distort and force lip 19 into groove 13.

Thus the parts are interconnected as a result of the engagement of lip 19 and by applying sufficient rotary pressure to either part, the same may be rotated upon the other part, the length of such rotary movement being limited by the travel of lug 20 in groove 14.

After the parts of the nut are assembled and while lug 20 is located at the rear end of groove 14 the coinciding apertures 11 and 17 are threaded as designated by T.

When applied for use, the nut with the wrench received faces coinciding with each other and lug 20 in the rear end of groove 14 is manipulated as a one piece nut and screwed onto a bolt, until the outer face of member 10 engages the face of the part through which the bolt passes.

To jam and lock the nut male member 16 is engaged by a wrench or like tool and rotated a short distance, thereby jamming member 10 so as to set up direct and reactionary forces and pressure, which will effectively lock the nut on the bolt.

As illustrated in Fig. 1, I prefer to form the groove 14 so that it gradually decreases in width from one end to the other (as from a to b), with the width of lug 20, equal to the width of the widest end of said groove.

Thus the side wall c of the groove is slightly eccentric with respect to the axes of member 16 and boss 18 and so that when member 16 is rotated, the outer face of lug 20 rides along the eccentric face of groove 14, thereby slightly moving the members 10 and 16 in opposite directions, to produce wedging action between said members and cause same to more tightly jam the nut upon the bolt.

To remove the nut, member 10 is engaged and unscrewed independently of members 16 until lug 20 engages the shoulder at the rear end of groove 14 thus relieving the pressure on both parts of the nut and the latter functioning as a one piece structure, may now be readily unscrewed from the bolt.

The improvements herein set forth while simple in character will result in the provision of an extremely effective and useful lock nut.

It will be understood that minor changes in the size, form and construction of the various parts of my improved lock nut may be made and substituted for those herein shown and described without departing from the spirit of the invention, the scope of which is set forth in the appended claims.

I claim as my invention:

1. A lock nut comprising a part having a shallow recess in its inner face and with an undercut groove encircling the bottom of said recess, a second part, a boss on the inner face of said second part, which boss is adapted to enter the recess in said first mentioned part, a deformable lip on the outer edge of said boss, which lip enters the groove in said first mentioned parts when the two parts are assembled there being an arcuate groove formed in said first mentioned part to the side of the recess therein and a lug on the side of said boss for engagement within said arcuate groove when the two parts of the nut are assembled.

2. A lock nut as set forth in claim 1 and the side face of which arcuate groove is eccentric to the axis of the openings through the parts of the nut.

OSCAR BARR.